US008809493B2

(12) United States Patent
Capps et al.

(10) Patent No.: US 8,809,493 B2
(45) Date of Patent: Aug. 19, 2014

(54) RESIN EXTRACT, EXTRACTION PROCESS AND USES THEREOF

(75) Inventors: Charles Capps, Little Rock, AR (US); Paul Ah Chee, Alice Springs (AU); Philip Delacretaz, Monegeetta (AU)

(73) Assignee: Spinifex Resins Pty Ltd, Monegeetta, Victoria (AU)

( * ) Notice: Subject to any disclaimer, the term of this patent is extended or adjusted under 35 U.S.C. 154(b) by 0 days.

(21) Appl. No.: 13/502,974

(22) PCT Filed: Oct. 20, 2010

(86) PCT No.: PCT/AU2010/001615
§ 371 (c)(1),
(2), (4) Date: Jul. 13, 2012

(87) PCT Pub. No.: WO2011/047447
PCT Pub. Date: Apr. 28, 2011

(65) Prior Publication Data
US 2013/0126114 A1    May 23, 2013

(30) Foreign Application Priority Data

Oct. 21, 2009  (AU) ................................ 2009227905
Dec. 3, 2009   (AU) ................................ 2009905931

(51) Int. Cl.
*C08L 93/00*    (2006.01)
*C09F 1/00*     (2006.01)
(52) U.S. Cl.
USPC ........................................ 530/200; 426/431
(58) Field of Classification Search
USPC .......... 426/425, 428, 429, 431; 162/158, 180; 530/200; 424/725; 528/483–499
See application file for complete search history.

(56) References Cited

U.S. PATENT DOCUMENTS

| 4,508,886 A | 4/1985 | Russell et al. |
| 7,259,231 B2 | 8/2007 | Cornish et al. |

FOREIGN PATENT DOCUMENTS

| EP | 1045890 B1 | 10/2000 |
| GB | 2119399 A * | 11/1983 |

OTHER PUBLICATIONS

Maiden, J.H., A Manual of the Grasses of New South Wales, William Applegate Gullick, Government Printer.1898, pp. 146-149, [online], retrieved from the Internet, [retrieved Aug. 26, 2013]. <URL: http://archive.org/details/manualofgrasseso00maidrich>.*
Valis, S., "Investigation into the distortion of *Triodia* and *Xanthorrhoea* resins on Aboriginal artefacts.", 1991 AICCM Bulletin, vol. 17, No. 1 & 2, pp. 61-74.
Burbidge, Nancy T., "A revision of the Western Australian species of *Triodia* R. Br.", Jour Roy Soc Western Australia, 1946, vol. 30, pp. 15-33.
Morton, S. R. [Reprint author]; Christian, K. A., "Ecological observations on the spinifex ant, *Ochetelius flavipes* (Kirby) (Hymenoptera: Formicidae), of Australia's northern arid zone.", Journal of the Australian Entomological Society, 1994, vol. 33, No. 4, pp. 309-316.

* cited by examiner

*Primary Examiner* — Dennis Cordray
(74) *Attorney, Agent, or Firm* — Lucas & Mercanti, LLP

(57) ABSTRACT

The present invention generally relates to resins and uses thereof in composite materials and products. The present invention also relates to extraction processes for obtaining resins from plants and plant materials. The invention also relates to resin extracts obtained from a plant of the genus *Triodia*, commonly known as Spinifex, processes for obtaining resins, modified resins and composite products incorporating resins.

8 Claims, 2 Drawing Sheets

RESIN EXTRACT, EXTRACTION PROCESS AND USES THEREOF

CROSS-REFERENCE TO RELATED APPLICATIONS

This application is a 371 of PCT/AU2010/001615, filed Oct. 20, 2010, which claims the benefit of Australian Patent Application Nos. 2009227905, filed Oct. 21, 2009 and 2009905931, filed Dec. 3, 2009, the contents of each of which are incorporated herein by reference.

FIELD OF THE INVENTION

The present invention generally relates to resins and uses thereof in composite materials and products. The present invention also relates to extraction processes for obtaining resins from plants and plant materials.

BACKGROUND OF THE INVENTION

Recent awareness of possible health effects regarding the use of formaldehyde based resins in wood products has led to the establishment of global emissions standards to reduce the use of formaldehyde. Formaldehydes typically used in industrial adhesives, synthetics, and wood products, have now been identified as respiratory sensitizers and possible carcinogens. The levels of formaldehyde emissions measured in buildings, typically residential buildings, frequently exceed safe tolerance levels. Regular items in homes and residential buildings produced with or containing formaldehydes based resins typically include flooring, cabinetry, walls, furniture and carpets.

Development of new adhesives and resins for composite and engineered wood products has been hindered due to cost considerations, health and safety issues, manufacturing limitations, performance, and production capabilities. However, increased consumer awareness has pressured industry to accelerate efforts in developing new resins and binders that are not based on formaldehyde formulations.

A challenge exists to develop alternative resins for use in the manufacture of wood products that are capable of attaining desired performance at similar costs to that of formaldehyde based resins. Although a range of alternative resins are available that are capable of providing appropriate performance properties, these alternative or non-formaldehyde based resins are typically of substantially higher cost and present other health issues, which limited the industry's' adoption of replacement resins.

Naturally occurring plant resins have important uses and applications in many products and industrial processes. Among these are coatings, varnishes, adhesives, and raw materials for organic synthesis.

*Triodia*, commonly known as Spinifex, is a large genus of hummock-forming grasses common to Australia. There are currently 65 recognised species in the *Triodia* genus (Lazarides et al. 2005). The *Triodia* plant has been known for centuries to contain a resin with high strength and water resistant properties, and has been traditionally used as an adhesive and waterproof coating for water craft. This perennial grass densely covers approximately 1.5 million square kilometers of the continent, mostly in the western half of Australia. The plant averages one meter in height and two to three meters in width, relatively dense, and forms in large clumps or "hummocks".

However, the commercial application of the *Triodia* resin has to date been unrecognized and problematical due to difficulties in developing a suitable extraction process for isolating the resin from the plant menterial.

A need exists to provide an alternative resin to those based on formaldehyde, or which overcomes, or at least alleviates, the problems of the prior art.

SUMMARY OF THE INVENTION

In a first aspect, there is provided an extraction process for obtaining an isolated resin extract from a plant of the genus *Triodia*, the process comprising the step of:
   i) treating a *Triodia* plant material with an extraction fluid to produce an extraction product comprising the resultant isolated resin extract.

In an embodiment of the first aspect, the isolated resin extract is anionic.

In one embodiment, the extraction fluid is a liquid or a supercritical fluid. In a further embodiment the supercritical fluid is supercritical $CO_2$.

In an embodiment of the first aspect, the process comprises a further step of:
   ii) at least partly separating the resultant isolated resin extract from the extraction fluid to obtain a concentrated resin extract.

In another embodiment of the first aspect, the concentrated resin extract is a liquid or solid. The form of the concentrated resin extract is dependent upon the solids content level. The concentrated resin extract can be in the form of a powder.

In an embodiment of the first aspect, the extraction fluid is provided in a ratio between 2:1 to 4:1 of extraction fluid to plant material on a weight basis, preferably a ratio of about 3:1. The extraction fluid can be selected from an aqueous liquid, an organic liquid or a combination thereof. In another embodiment, the aqueous liquid is a caustic liquid. The caustic liquid preferably has a pH between 9 to 11. The organic liquid can be selected from the group consisting of alcohols, ethers, ketones, or any combination thereof. The alcohol can be selected from at least one of methanol, ethanol, propanol, or a combination thereof. The ethers can be petroleum ethers. The ketone(s) can be selected from at least one of methyl ethyl ketone, methyl isobutyl ketones, ethyl isobutyl ketones, methyl isopropyl ketones, or a combination thereof.

In one particular embodiment, the extraction fluid comprises or consists of methanol. In another particular embodiment, the extraction fluid comprises or consists of petroleum ether. In another particular embodiment, the extraction fluid comprises or consists of methyl ethyl ketone.

In another embodiment of the first aspect, in step i) the extraction fluid is a caustic aqueous liquid, and the process comprises a further step iii) of at least partially neutralising the extraction product, resultant extract or concentrated resin extract.

In an embodiment of the first aspect, the extraction step i) involves applying an elevated temperature and/or pressure to the extraction fluid that is above 25° C. or atmospheric pressure. In a further embodiment, the extraction fluid is an aqueous liquid and the elevated temperature is at least 50° C., particularly at least 70° C., more particularly at least 90° C.

According to a further embodiment of the first aspect, the extraction process comprises a step of drying the extraction product or isolated resin extract to form a concentrate, powder or solid resin extract, preferably having a moisture content of less than 5%.

In an embodiment of the first aspect, the extraction product, isolated resin extract, concentrate, powder or solid resin extract, is subjected to treatment with an acid or catalyst to modify the thermosetting rate property thereof. The treatment with the acid can comprise adjusting the pH of the extraction product, isolated resin extract, or concentrate, powder or solid resin extract thereof, to less than 5, particularly between 3 and 4.

In a second aspect, there is provided an extraction product, isolated resin extract or concentrated resin extract obtained by the process according to the above first aspect and embodiments thereof.

In a third aspect, there is provided an isolated resin extract distinguished by one or more of the following peaks, measured using infrared absorption spectroscopy and expressed in terms of $cm^{-1}$: 719, 730, 1055, 1171, 1473, 1638, 1737, 2850, 3410, 3650.

In a forth aspect, there is provided an isolated resin extract distinguished by one or more of the following differential scanning calorimeter (DSC) results, measured using a standard ramp method on a 2920 DSC and expressed in terms of heat flow (J/g) versus temperature (° C.):

a positive heat flow above a temperature of 170° C. with a maximum heat flow between a temperature of 300-350° C.;

thermally curable at a temperature of at least 170° C. to result in a thermoset resin having a glass transition temperature of at least 300° C.

In an embodiment of the third and forth aspects, the extract is obtained from a plant of the genus *Triodia*.

In a fifth aspect, there is provided a resin concentrate, powder or solid resin extract, obtained from a resin of a plant of the genus *Triodia*, or a resin according to any one of the above aspects and embodiments thereof.

In a sixth aspect, there is provided an isolated modified resin extract obtained from a resin of a plant of the genus *Triodia*, or a resin according to any one of the above aspects and embodiments thereof, wherein the modified resin is distinguished by having a thermosetting temperature of between 150° C. and 200° C., preferably between 170° C. and 180° C., more preferably about 175° C.

In a seventh aspect, there is provided a composite product comprising a first material bonded together with a bonding material, the bonding material comprising a resin obtained from a plant of the genus *Triodia*, or a resin according to any one of the above aspects and embodiments thereof.

In an embodiment of the seventh aspect, the first material comprises particles or fibres of a cellulosic material, preferably of wood. The bonding material can further include a formaldehyde based resin, melamine based resin, isocyanate based resin, or mixture thereof. In a particular embodiment, the composite product is a fibre board or particle board.

In an eighth aspect, there is provided a process of manufacturing a composite product comprising:
  i) mixing particles or fibres of a first material with a bonding material comprising a resin obtained from a plant of the genus *Triodia*, or a resin according to any one of the above aspects and embodiments thereof; and
  ii) subjecting the mixture from step i) to elevated temperature and pressure for a predetermined time to obtain the composite product.

In an embodiment of the eighth aspect, the elevated temperature is between about 160 and 220° C., particularly between 170 and 210° C., and more particularly between 180 and 200° C.

In another embodiment, the composite material is substantially wax free.

In another embodiment of the eighth aspect, the bonding material is provided in an amount of less than 5% by weight of the bonding material in the composite material, preferably less than 2%, more preferably less than 1%, particularly less than 0.5%. The composite material can be core and/or face treated with the bonding material.

The composite products according to the above aspects and embodiments thereof can be distinguished by having one or more of the following the following properties:
  an internal bond of at least 300;
  a density IB of about 47;
  a modulus of rupture (MOR) of at least 2000;
  a density (MOR) of about 46;
  a modulus of elongation (MOE) of at least 40000;
  a face screw of at least 400;
  an edge screw of at least 300;
  a % swell and % edge swell over 24 hours of less than 5%, particularly less than 4%, and more particularly between 3.3 and 3.8%.

In a ninth aspect, there is provided a use of an isolated resin extract obtained from a plant of the genus *Triodia* in the manufacture of a composite product. In an embodiment, the composite product is a fibre board or particle board.

In a tenth aspect, there is provided a use of the liquid mixture, resin extract, concentrate, solid, powder, modified resin extract or other form thereof according to the above aspects and embodiments, as an adhesive, coating, varnish, raw material, binder, thermosetting agent, or as a component in a composite product.

The resins of the above aspects are suitable to produce or enhance existing products, particularly where the properties of water resistance and reduction of formaldehyde content or other emissions are desirable.

BRIEF DESCRIPTION OF THE DRAWINGS

Preferred embodiments of the present invention will now be further described and illustrated, by way of example only, with reference to the accompanying drawings in which.

DETAILED DESCRIPTION OF THE ABBREVIATIONS

Figure 1:
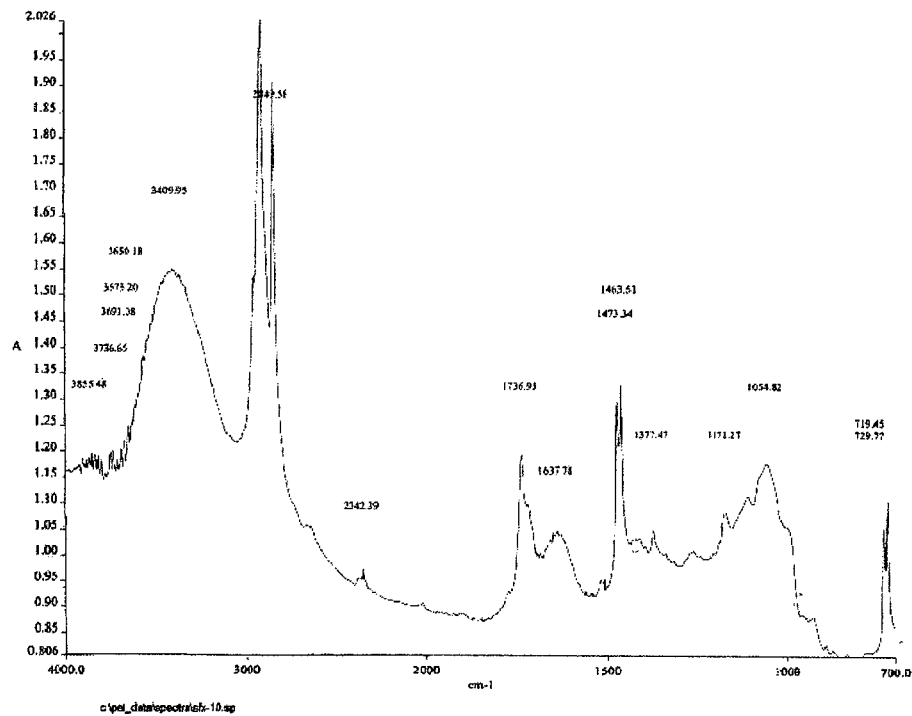
FIG. 1 shows infrared spectroscopy results identifying absorption peaks from resin extracts obtained from plants of *Triodia* genus.

In the Examples, reference will be made to the following abbreviations in which:
C Celsius
DSC Differential Scanning calorimeter
DWF Dry Weight of Fibre
F Fahrenheit
h Hour
MDF Medium-density Fibreboard
MOR Modulus of Rupture
Mn Number average molecular weight
Mw Weight average molecular weight
MW Molecular weight
OSB Oriented Strandboard
Wt % weight percentage

DETAILED DESCRIPTION OF THE INVENTION

Recent awareness of the possible health effects of formaldehyde used in synthetic resins for composite products, and in view of global emissions standards that have been recently established to reduce the use of formaldehyde, led the applicant to investigate whether resins sourced from plants may be suitable for use in composite products.

The applicant identified plants or grasses from the genus *Triodia*, commonly known as Spinifex, as containing resins that may be suitable for use in composite products. Spinifex has been known for centuries to contain a resin with high strength and water resistant properties, and has been traditionally used as an adhesive and waterproof coating for water craft. The applicant therefore began an investigation into processes for extraction of the resins from these plants to see if a resin extract could be obtained, and if so, whether the resin extract or modifications thereof would provide advantageous properties.

The investigations involved determining whether resin extracts from the raw Spinifex plant could provide resins capable of replacing formaldehyde based resins. Studies by the applicant have indicated that resin extracts from Spinifex, and in particular resin extracts obtained by particular extraction processes and modified resin extracts thereof, provide resins that are capable of use in bonding composite products, particularly wood or cellulose based products.

The resin extracts, or modified resin extracts, according to the above aspects have particular value in use as an adhesive for the manufacture of particleboard, medium-density fibreboard (MDF), oriented strand board (OSB), and plywood. Dilute solutions of the resin extracts also have particular value for use as a wet strength resin for manufacture of paper, packaging materials and products thereof. A purified form of the resin extracts, such as a liquid concentrate, slake or powder thereof, can also be used as, or a component in, a coating, powder coating, or paint base.

Methods of Extraction and Resin Extracts

To identify a resin extract that would be suitable for a range of uses including coatings, adhesives and agents for binding fibre and particle boards, the extraction of resin from raw Spinifex plant material was investigated. Initial resin extraction attempts involved caustic methods common to wood pulping and papermaking practices. Further investigations involved the use of organic solvents, various digestion times and pH level adjustments.

The extraction process for obtaining an isolated resin extract from a plant of the genus *Triodia* can comprise the steps of i) treating a *Triodia* plant material with an extraction fluid to produce an extraction product comprising the resin extract. The extraction fluid can be a liquid or supercritical fluid such as $CO_2$.

The extraction process for obtaining an isolated resin extract from a plant of the genus *Triodia* can also comprise the steps of i) treating a *Triodia* plant material with an extraction liquid at an elevated temperature to produce a suspension comprising the resultant extract; and optionally ii) at least partly separating the resultant extract from the liquid mixture to obtain a concentrated resin extract. The plant material is typically cleaned and comminuted before the extraction step of treating the plant material with a liquid solution. Other pre-extraction steps may include comminuting or cutting to standard lengths the plant material. "*Triodia* plant material" may be obtained from any part of a plant from any of the species of *Triodia*.

Although resin extracts may be obtained from any species of the *Triodia* genus, in one embodiment the resin extract is obtained from one of the following species: *pungens, basedowii, wiseana*. More particularly, the resin extract is obtained from the following species: *pungens*.

The term "extraction product" used herein means any concentration, essence or abstraction, of a resin extract, or liquor comprising the resin extract, such as a solution, dispersion or distillate, obtained from a plant material. The extraction product is typically a liquid mixture comprising the resin extract and one or more other liquids, and may include various solids/particulates abstracted from the plant material. Typically, all solid plant materials are separated from the liquid mixture.

The term "supercritical fluid" includes supercritical carbon dioxide and refers to a fluid that is at or above both its critical temperature and pressure. For example, carbon dioxide usually behaves as a gas in air at standard temperature and pressure or as a solid (i.e. dry ice) when frozen. If the temperature and pressure are both increased above the critical point for carbon dioxide, it can adopt properties midway between a gas and a liquid. More specifically, carbon dioxide behaves as a supercritical fluid above its critical temperature (31.1° C.) and critical pressure (72.9 atm/7.39 MPa), having properties of a gas but with a density like that of a liquid. Supercritical $CO_2$ can therefore be used as a solvent in extraction processes and has the added benefit of low toxicity and environmental impact. The relatively low temperature of the process involving supercritical $CO_2$ and the stability thereof also allows most compounds to be extracted with little damage or chemical modification.

The term "anionic" means a liquid mixture or resin extract that is overall anionic, as opposed to cationic or neutral, and includes a liquid mixture or resin extract that has a negative Zeta potential when measured on a Mütek analyser. The liquid mixture or resin extract may be modified to be more or less anionic, such as by adding cationic solutions to make the suspension neutral or cationic. Although not wishing to be bound by any theory, the "anionic" property of the resin extract may correlate with a resin extract or modified resin extract that is capable of substantial ionic bonding interactions that facilitate adhesive strength and bonding when used as a component in composite products.

It will be appreciated that the Zeta potential does not specifically correlate to acidity or basicity. Zeta potential is the potential difference between the dispersion medium and the stationary layer of fluid attached to the dispersed particle. The Zeta potential generally indicates the degree of repulsion between the adjacent, similarly charged particles in the dispersion. Higher Zeta potentials indicate stability, i.e. wherein the solution or dispersion resists aggregation. Systems with low Zeta potentials may flocculate or coagulate under certain conditions.

The extraction fluid used in step i) of the first aspect can be selected from any fluid suitable for extracting resin from a plant material containing a resin component. An extraction fluid may include extraction liquids or supercritical fluids such as supercritical $CO_2$. The extraction liquids (or fluids) may comprise a single liquid, any mixture of two or more liquids, and may include other additives or modifiers, such as various acids, bases, buffering agents or salts. Mixtures of two or more liquids may be immiscible or azeotropic solutions, emulsions, dispersions, or other forms. Liquids that are suitable include water, organic liquids or mixtures thereof. The organic liquid can be selected from the group consisting of alcohols, ethers, ketones, or any mixture thereof. The alcohols can be selected from at least one of methanol, ethanol, propanol or a combination thereof. The ethers can be petroleum ethers. The ketones can be selected from at least one of methyl ethyl ketone, methyl isobutyl ketones, ethyl isobutyl ketones, methyl isopropyl ketones, or combinations thereof. Other organic liquids may also be used.

In an embodiment of the first aspect, the extraction liquid is provided in a ratio between 2:1 to 4:1 of extraction liquid to plant material on a weight basis, and more particularly at a ratio of about 3:1. It will be appreciated that optimal ratio of liquid to plant material will depend on the nature of the liquid, size and type of extraction equipment, amount of plant material undergoing extraction and other conditions under which the extraction process is conducted.

The extraction liquid may also be a caustic liquid, such as an aqueous liquid having a pH of at least 9, preferably at least 10, and more particularly about 11. Typically, acid extraction methods are avoided since undesirable crosslinking of the resin may occur. It will be understood that the use of caustic liquids may typically involve a further neutralisation step of at least partially neutralising the liquid mixture or resultant extract obtained using the caustic liquid.

In another embodiment of the first aspect, the extraction step i) involves an elevated temperature of at least 50° C., particularly at least 70° C., more particularly at least 90° C. It will be appreciated that the degree of elevation of temperature can be optimised and adjusted depending on the nature of the extraction liquid, amount and form of plant material, ratio of liquid to plant material, size and type of equipment, and other conditions under which the extraction process is conducted.

It will be appreciated that a large range of equipment may be suitable for use in the extraction process. An example of suitable equipment includes a digester, such as a steam jacketed digester. A mesh box may also be used to contain initial plant material in particular locations.

In another embodiment of the first aspect, a further step can be provided after step i) of concentrating the extraction product or liquid mixture to form a concentrated resultant extract. The concentrated resultant extract can then be separated from the liquid mixture to obtain a concentrated liquid resin extract.

An "isolated resin extract" means a resin that has been extracted and separated from a plant material by treatment with an extraction fluid. A "concentrated resin extract" means a resin that has been extracted and separated from a plant material by treatment with an extraction fluid and concentrated by removal of at least part of the fluid. The use of the term "resin" or "resin extracts" generally includes extraction products, liquid mixtures or concentrated resin extracts comprising the isolated resin extracts including solid and powder forms.

The resin extracts according to the above aspects may be liquids and/or solids, and may include viscous and semi-solid forms, or mixtures thereof. The resin extracts or concentrated resin extracts can also be dried to form a concentrate, powder or solid resin extract.

In one embodiment, the resin extracts are liquid mixtures, such as suspensions, comprising the resin extracts and one or more liquid carriers. The liquid carriers may be selected from a range of liquids suitable for use as carriers for resins including aqueous and organic liquids capable of forming solutions, emulsions, dispersions, mixtures, or separated layers, with the resin extracts. The resin extracts may also be in a neat form substantially free of liquid carriers, or provided as a concentrate. In addition, it will be appreciated that the resin extracts or liquid mixtures thereof may include other additives, for example pH modifiers such as acids, bases or buffer solutions, or surfactants, or other stabilisers.

In one particular embodiment the liquid carrier is selected from an aqueous or organic liquid, or mixture thereof. The organic liquid can be selected from the group consisting of alcohols, ethers, ketones, or any mixture thereof. The alcohols include methanol, ethanol and propanol. The ethers include petroleum ethers. The ketones include methyl ethyl ketone, methyl isobutyl ketones, ethyl isobutyl ketones and methyl isopropyl ketones. Other organic liquids may be used.

In one particular embodiment, the resin extract is a liquid mixture comprising the resin extract in an amount by weight % of between 4-12%, particularly in an amount by weight % of between 7-9%.

In another particular embodiment, the resin extract is a liquid concentrate comprising the resin extract in an amount by weight % of at least 40%, particularly in an amount by weight % of at least 50%.

In another embodiment, the resin extract is a solid such as a powder or slake. In one particular embodiment, the powder or slake is substantially free of liquid carrier or extraction liquid.

The pH binding ranges of the resin extracts are typically from about 3.0 to about 9.0.

Isolated Resin Extracts

The resin extracts obtained from the extraction processes as described above were further investigated.

According to a second aspect as described above, the isolated resin extract can be distinguished by one or more of the following peaks, measured using infrared (IR) absorption spectroscopy and expressed in terms of $cm^{-1}$: 719, 730, 1055, 1171, 1473, 1638, 1737, 2850, 3410, 3650.

In another embodiment, the types of bonding identified by IR include one or more of the following: aromatic C—H (719 $cm^{-1}$, medium/strong), chloroalkane C—X (730 $cm^{-1}$, weak/medium), primary alcohol C—O (1055 $cm^{-1}$, strong/broad), fluoroalkane C—X (1171 $cm^{-1}$, double strong/broad), alkyl C—H (1473 $cm^{-1}$, strong), primary amine N—H (1638 $cm^{-1}$, strong), carboxylic C═O (1737 $cm^{-1}$, strong), ammonium N—H (2850 $cm^{-1}$, multiple broad), primary amine N—H (3410 $cm^{-1}$, strong), alcoholic and phenolic O—H (3650 $cm^{-1}$, broad).

According to a third aspect as described above, the isolated resin extract can be distinguished by one or more of the following differential scanning calorimeter (DSC) results, measured using a standard ramp method on a 2920 DSC and expressed in terms of heat flow (J/g) versus temperature (° C.):

a positive heat flow above a temperature of 170° C. with a maximum heat flow between a temperature of 300-350° C.;

thermally curable at a temperature of at least 170° C. to result in a thermoset resin having a glass transition temperature of at least 300° C.

Minor differences may occur between resin extracts obtained from different species of plants from the *Triodia* genus. For example, certain species may contain more acidic or base constituents, carbohydrates, glycerides, or other components.

Modified Resin Extracts

The isolated resin extract, concentrate, powder or solid resin extract, according to the aspects and embodiments described above can also be subjected to treatment with an acid or catalyst to modify the thermosetting rate property thereof. Treatment with an acid can involve adjusting the pH of the isolated resin extract, or concentrate, powder or solid resin extract thereof, to have a specific pH, typically lower than about pH 6, such as a pH of between 3 and 5.

In one embodiment, the pH of the concentrate is between 3 and 5. This range is typically desired to provide the concentrate with appropriate properties including affect on cellulosic materials and crosslinking properties.

Modifications to the resin to adjust properties may be achieved using fumaric and maleic acids, and phthalates. The phthalates may include diethylhexypthalate (DEHP), monoewthylhexypthalate (MEHP), dimethylpthalate (DMP), butylbenzylpthalate (DBP), and dioctylpthalate (DOP).

Composite Products and Methods of Manufacture

The resin extracts, or concentrates, powders, solids or modified extracts thereof, are useful as a component or a binding agent in the manufacture of fibre or particle boards. The resins can act as binding agents or adhesives for the manufacture of all types of fibre and particle boards including medium-density fibreboard (MDF), oriented strand board (OSB), and plywood. The resin extracts may be used in crude or diluted form, such as a resin extract obtained from a caustic process comprising between 7-9% by weight of resin in the liquid mixture.

Current urea/urethane and formaldehyde based resins typically require at least 7% by weight addition to fibre material to properly function as an adhesive binder in fibre boards. Substitution with isocyanate based resins typically requires about 2.5% by weight of the resin to the fibre material. The applicant has identified that the resin extracts, or modified resin extracts, according to at least some embodiments of the above aspects are effective for use as adhesive binders in fibre board and other composite product manufacture in an amount of 1% or less by weight of the resin to the fibre material, depending on target strength and density requirements. Fibre boards or other composite products manufactured using the resin extracts, or modified resin extracts, according to the above aspects also have inherent resistance to moisture and solvents, once cured. Consequently, wax addition in such products may be reduced or removed entirely.

An advantageous physical property of particle and fibreboard panels according to the above aspects is that an increase in strength occurs with similar or lower levels of present resin extracts in comparison to that of conventional resins.

The use of the resin extracts according to the above aspects and embodiments in the manufacture of fibre or particle boards may employ resin extracts in a range of forms and concentrations. In a particular embodiment, the resin extracts contain at least 30% by weight resin, more particularly at least 50%. The pH of the resin extracts are preferably less than about 5, and more preferably between about 3 and 4, to provide appropriate properties to cellulosic materials and crosslinking on heating.

The fibreboard or particleboard panels can be treated at less than 1% dry weight of fiber (DWF), and typically at less than 0.5% DWF.

Board strength after hot pressing, measured in modulus of rupture (MOR), showed that the resin extracts even when used in the manufacture of fibreboard panels at a concentration of 0.34% had a MOR of 1187, being higher than that of the standard control measured at 685. The standard control being treated with linseed oil, catalyst, and wax in accordance with industry practice. In the case of particleboard, the MOR was higher for panels produced from the Spinifex resin (about 12.5% higher) with virtually the same internal bond (IB) using 90% less resin in comparison to panels produced with conventional formaldehyde based resins.

Examples of particleboard and fibreboard panels using resin extracts obtained from Spinifex are provided in Examples 10 and 11.

The resin extracts may also be combined with conventional binding agents, such as UF resins, in the manufacture of composite products.

Manufacture of the composite products typically involves adding an amount of cellulosic fibres into a drum resonator with the resin extracts to form a mixture. After mixing and distribution of the resins in the fibre, the mixture is poured into mat formers equipped with stainless steel platens. The mats can then be loaded into heated presses to form a panel, typically above about 170° C. and pressed for about five minutes. The panels are removed from the press and platens and allowed to cool for about four hours. The panels can then be cut or shaped as required.

Target densities can vary depending on the intended uses, sizes and thicknesses of the fibreboards or particleboards, but for a typical particleboard of about 20 mm in thickness the density may be about 700 kg/m$^3$.

After review of the physical properties of forty particleboard panels with similar results, a definite increase in panel strengths was evident for Spinifex panels comprising Spinifex resin extracts. It was also noted that substantially greater water resistance existed with the Spinifex panels that had no wax addition.

Other hardwood fibre based products may also be manufactured using the resin extracts. In particular, the resin extracts may be used in the manufacture of products having small amounts of refined hardwood fibres, for example less than about 10%, more particularly less than about 5%. The manufacture of these products may involve the mixing of the resin extracts with such fibres in tanks along with other additives such as linseed oil emulsions, ferric acid and wax emulsions.

To those skilled in the art, it will be recognized that standards, processes and test methods practiced, generally are contained in manuals authored by the American Particleboard Association, ASTM, TAPPI, Composite Board Manufacturer's Handbook, and the Composite Panel Makers Association.

Other Uses of Resin Extracts

The resin extracts, and typically as more dilute solutions, have particular value for use as wet strength resins for manufacture of paper, packaging materials and products thereof. Wet strength resins present value to paper, cardboard, and composite paper products since they increase structural strength, burst strength, and reduce fiber mass.

A purified form of the resin extracts, such as a liquid concentrate, slake or powder thereof, can also be used as, or a component in, a coating, powder coating, or paint base.

General Points

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia before the priority date of each claim of this application.

All publications mentioned in this specification are herein incorporated by reference.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

As used in the specification the singular forms "a" "an" and "the" include plural references unless the context clearly dictates otherwise. Thus, for example, reference to "a solvent" includes mixtures of solvents, reference to "an agent" includes mixtures of two or more such agents, and the like.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Materials and Methods

In order that the nature of the present invention may be more clearly understood, preferred forms of the invention will now be described by reference to the following non-limiting examples.

An investigation was undertaken to identify a resin extract that would be suitable for a range of uses including coatings, adhesives and agents for binding fibre and particle boards, the extraction of resin from raw Spinifex plant material was investigated.

Isolated Resin Extracts and Extraction Methods

EXAMPLE 1

Caustic Extraction Method 3 kg of Spinifex fibre was loaded into a mesh box and immersed in 230 liters of water in a steam jacketed digester. The pH of the water was adjusted to a pH 11 using sodium hydroxide. The mixture was then boiled at 100° C. for 4 hours, mesh removed, and a first distillate (liquor) collected having a pH of 6.2. A replicate digestion was then conducted, with the addition of nitrogen infusion to prevent possible oxidation reactions, and a second distillate (liquor) collected having a pH of 8.5. The first and second distillates were then combined and boiled down to provide a concentrate containing 32.5% by weight resin. The pH of the concentrate was measured to be 11.5. Hydrochloric acid (6.0N) was titrated into the concentrate until an emulsification occurred, namely where the sediment solids became a suspension in the liquid concentrate. The pH of the emulsified concentrate was measured to have a pH of 4.5. No indication of exothermic temperature gain was observed.

EXAMPLE 2

Extraction Method Using Water

Spinifex fibre was added to a steam jacketed digester encased in a mesh box and immersed in water at a ratio of 4:1, water weight to fibre weight. The mixture was cooked for 1 hour at 100° C. to obtain a first distillate. The first distillate was evacuated and collected. The cooked fibre was also collected. Another digestion was then immediately conducted using a 3:1 ratio, water weight to fibre weight to obtain a second distillate. The second distillate was evacuated and collected. Samples of the first and second distillates taken at 30 minutes of cook time yielded distillates having a pH of 6.4. The resin % by weight in both the first and second distillates was about 3%. The first and second distillates were combined and evaporated to give a concentrate having a pH of 5.9.

EXAMPLE 3

Extraction Method Using Methanol 7.5 grams of Spinifex fibre was placed in a Soxhlet extractor with 100 ml of methanol. The mixture was heated to 80° C. and allowed to reflux for two hours. Additional Spinifex fibre was added at each two hour interval until a total of 30 grams had been introduced into the methanol solution. A distillate was then collected comprising about 1.5 grams of a viscous resin extract.

Samples of the resin were then prepared for FTIR analysis. All resin samples provided similar IR absorption peaks, which were substantially the same as that shown for resins obtained from Examples 4 to 6 below (see Table 1 below).

TABLE 1

Absorption peaks identified from resin extracts
FTIR Frequency Interpretation

| Bond | Type of Bond | Specific Type of Bond | Absorption Peak | Appearance cm$^{-1}$ |
|---|---|---|---|---|
| O—H | alcohols, phenols | low conc. | 3650 | broad |
| N—H | primary amines | any | 3410 | strong |
| N—H | ammonium ions | any | 2850 | multiple broad peaks |
| C=O | carboxylic acids/derivates | esters & lactones | 1737 | influenced by conjugation ring size (as w/ketones) |
| N—H | primary amines | any | 1638 | strong |
| C—H | alkyl | methylene | 1473 | strong |
| C—X | fluoroalkanes | trifluromethyl | 1171 | two strong, broad bands |
| C—O | alcohols | primary | 1055 | strong, broad |
| C—X | chloroalkanes | any | 730 | weak to medium |
| C—H | aromatic | monosubstituted benzene | 719 | medium to strong |

EXAMPLE 4

Extraction Method Using Petroleum Ether

The above described procedure for Example 3 was repeated using petroleum ether as the liquid medium. Approximately 1.1 grams of a resin extract was collected. Samples of the resin were then prepared for FTIR analysis. All resin samples provided similar IR absorption peaks, which were substantially the same as that shown for resins obtained from Examples 3, 5 and 6 (see Table 1 above).

EXAMPLE 5

Extraction Method Using Methyl Ethyl Ketone

The above described procedure for Example 3 was repeated using methyl ethyl ketone (acetone). During the cook and reflux, solid tan particulates appeared in the MEK and proceeded to agglomerate. After the extraction time was met, the solids were then filtered and dried, yielding 0.45 grams of powder. The remaining solution was then heated to 80° C. and placed under vacuum to remove the MEK. Approximately 2.8 grams of resin extract remained in the flask. Samples of the resin were then prepared for FTIR analysis. All resin samples provided similar IR absorption peaks, which were substantially the same as that shown for resins obtained from Examples 3, 4 and 6 (see Table 1 above).

EXAMPLE 6

Concentrated Resin Extracts

Evaporation of the 3:1 extraction from Example 2 was conducted until the residual distillate contained 51% by weight resin. The resin was tarlike and dark brown in appearance. Samples of the resin were then prepared for FTIR analysis. All samples provided substantially the same IR absorption peaks as that provided by resin samples obtained from Examples 3 to 5 above (see Table 1 above). Subsequent digestions/extractions were compared by FTIR to establish a uniformity of product for continued experiments and panel making. Additionally, several samplings of condensed resin were then tested on a differential scanning calorimeter (DSC) to determine the thermosetting properties of the resin (see FIG. 2).

Methods of Modifying Resins and Modified Resins

EXAMPLE 7

Modified Resin Extracts

Figure 2:
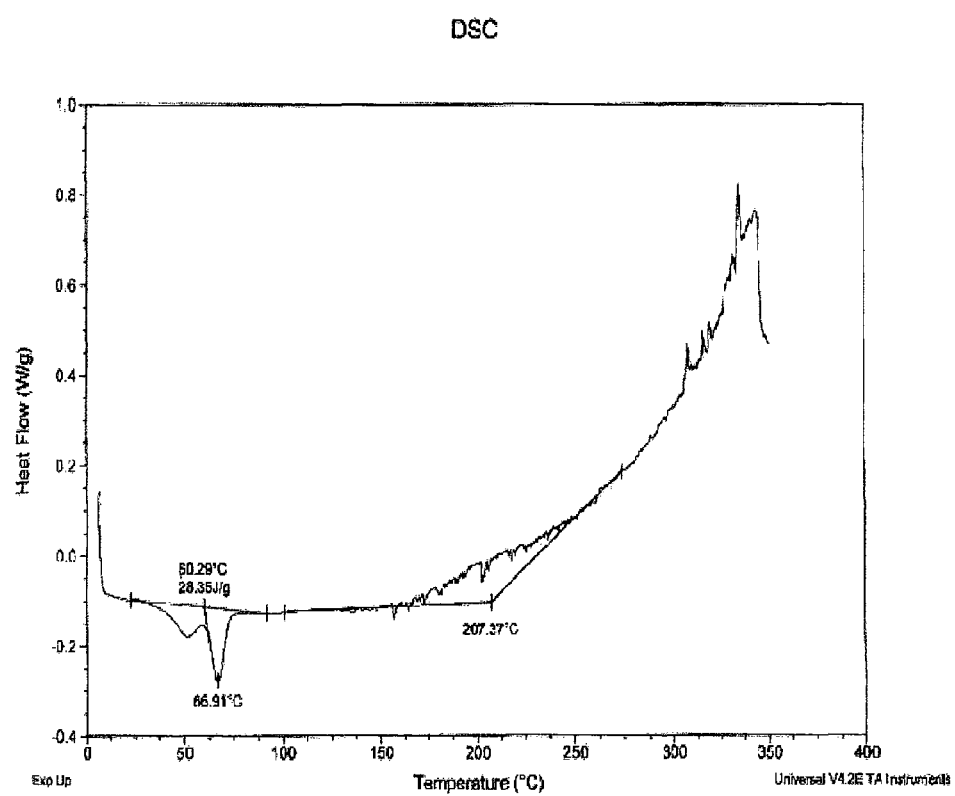
FIG. 2 shows differential scanning calorimeter (DSC) results from resin extracts obtained from plants of *Triodia* genus.

Following review of the differential scanning calorimeter (DSC) results of Example 6 and FIG. 2, experiments were conducted to modify the Spinifex resin extracts to have a lower thermosetting threshold, or in other words a lower energy input to energy generation threshold, to be approximately 175° C. To achieve this and obtain a modified resin extract, a tarlike concentrate of the resin extracts was added to deionised water and subsequently adjusted with acid and emulsified until it reached a pH of 3.5. The modified resin was again tested and the DSC indicated the thermosetting threshold temperature was about 173° C., which is a temperature well suited to industrial practice. A temperature of about 175° C. is particularly suitable because this represents a preferred press temperature for producing various wood based composite products and therefore provides efficient use of energy and application with typical equipment used.

EXAMPLE 8

Anionic Resin Extracts

During digestion studies, unusual shifts in pH values prior to and during digestion led to a further investigation to determine the ionicity of the resin extracts. Initial measurements on resin extracts containing 51% by weight resin were observed to have on average a Zeta potential on a Mutek analyser of −146, which corresponds to an ionicity being slightly anionic in nature. Attempts were made to achieve an isoelectric level in the resin extracts via adjustment with a cationic potential solution (0.001 N Poly DaDMac). In contrast to expectations, an increase in anionic Zeta potential was observed on addition of the cationic potential solution, indicating that ionic bonding is a property of the resin extract. Ionic bonds are extremely strong bonds and may have advantages such as powder coatings with metals and synthetics.
Composite Products and Methods of Manufacture

EXAMPLE 9

Comparative Study of Particleboards

An investigation was undertaken to compare the performance of a series of conventional particleboard panels formed using urea formaldehyde (UF) based resins with a series of particleboard panels formed using Spinifex resin extracts. The series of conventional particleboard panels used a commercially available urea formaldehyde resin that is commonly used in particleboard and medium density fibreboard industries and was supplied by Hexion. The series of particleboard panels formed using Spinifex resin extracts used a modified resin extract according to Example 7 above, which involved a resin extract containing 51% by weight resin and a pH of 3.5.

Cellulosic fibres were weighed and placed in a drum resonator and separately treated with the UF resins and Spinifex resin extracts to form two separate mixtures, a conventional composite material mixture and a Spinifex composite material mixture. After thorough mixing and distribution of the resins in the fibre, each composite mixture was poured into mat formers equipped with stainless steel platens, top and bottom. The mats were then loaded into heated presses set at 195° C. and pressed for five minutes, to form a series of separate panels, conventional panels using UF resins and Spinifex panels using Spinifex resin extracts. The panels were then removed from the press and platens and allowed to cool for four hours. The panels were then cut into standard size for each particular test type, identified by marking pen, and staged to test equipment areas.

Table 2 below shows the performance of the Spinifex panels using the Spinifex resin extracts in comparison to the conventional panels using the UF resins. The control panel was a conventional panel formed using a UF based resin containing 62% by weight resin with 1.1:1 mole ratio of urea:formaldehyde, which represents a formulation providing presently understood maximum bonding performance under certain conditions, i.e., fiber type such as hardwood vs. softwood. The control panel also comprised core UF resin treatment 6.6%, face UF resin treatment 9.6%, core wax rate 0.30%, face wax rate 0.65%. The Spinifex panels using the Spinifex resin extracts comprised substitution at 6.6% core and face treatment with no wax addition. The panel processing conditions comprised a press temperature of about 175° C., a cook time of about 4 minutes, a target density of about 750 kg/m³, target thickness about 20 mm.

TABLE 2

Properties of UF Based Conventional Particleboards versus Spinifex Resin Based Particleboards

| Property | Conventional UF Resin Based Particleboard^ | Spinifex Resin Based Particleboard# |
|---|---|---|
| Internal Bond | 125 | 324 |
| Density IB (kg/m³) | 761 | 758 |
| MOR | 1835 | 2107 |
| Density (MOR) (kg/m³) | 762 | 730 |
| MOE | 366592 | 430090 |
| Face Screw | 319 | 445 |
| Edge Screw | 219 | 337 |
| % Swell 24 hr* | 18.24% | 2.99% |
| % Edge Swell 24 hr* | 14.85% | 3.61% |
| % Swell 1 hr boil* | 17.83% | 3.46% |

^Control: UF resin containing 62% by weight resin with 1.1:1 mole ratio (Control)
^Core UF resin treatment 6.6% (Control)
^Face UF resin treatment 9.6% (Control)
^Core Wax rate 0.30%
^Face Wax rate 0.65%
Spinifex resin substituted at 6.6% core and face treatment with no wax addition:
Press temperature 175° C. and cook time 4 minutes
Target density 750 kg/m³ and target thickness 20 mm
*Denotes destruction of UF samples After review of the physical properties of forty particleboard panels with similar results, a definite increase in panel strengths was evident for Spinifex panels comprising Spinifex resin extracts. It was also noted that substantially greater water resistance existed with the Spinifex panels that had no wax addition.

EXAMPLE 10

Testing of Panels

A commercial product being produced and sold worldwide is labscale simulated by placing 48,000 grams of 2.3% refined hardwood fibre stock in a mix tank along with 3.5% linseed oil emulsion and mixed for thirty seconds. 0.3% ferric acid and 2% wax emulsion is then added and mixed for two minutes. 48,000 grams of 2.3% hardwood fibre stock was again placed in a mix tank along with 0.34% Spinifex resin prepared from the 3:1 extraction according to Example 3. Fibre was collected in both samples, formed, and pressure heat treated until panels were formed. After cooling, panels were weighed, cut to test size specificity and then tested by industry standards for modulus of rupture (MOR) and internal bond (IB). Table 3 below compares the bonding performance between Series "2" (conventional binder) and Series "3" (Spinifex resin).

TABLE 3

Bonding Performance Comparison of Spinifex Panels with Conventional Panels

| MOR | Weight | Length | Width | Tks | Span | Load | MOR | Density | Ave MOR | | | Load | IB |
|---|---|---|---|---|---|---|---|---|---|---|---|---|---|
| 2-1 | 59.9 | 6.00 | 3.02 | 0.257 | 4 | 81.1 | 245 | 49.1 | 240 | 2.03 | 2.03 | 213 | 52 |
| 2-2 | 59.4 | 6.03 | 3.01 | 0.249 | 4 | 73.2 | 235 | 50.0 | | 2.03 | 2.03 | 201 | 49 |
| | | | | | | | | | | 2.03 | 2.03 | 204 | 50 |
| 3-1 | 63.8 | 6.03 | 3.02 | 0.258 | 4 | 98.0 | 293 | 51.7 | 274 | | | | |
| 3-2 | 63.8 | 6.08 | 3.01 | 0.260 | 4 | 86.0 | 254 | 51.1 | | 2.03 | 2.03 | 196 | 48 |
| 3-3 | | | | | | | | | | 2.03 | 2.03 | 225 | 55 |
| | | | | | | | | | | 2.03 | 2.03 | 163 | 40 |

The invention claimed is:

1. An extraction process for obtaining an isolated resin extract from a plant of the genus *Triodia*, the process comprising the steps of:
   i) treating a *Triodia* plant material with an extraction fluid to produce an extraction product comprising the resultant isolated resin extract, wherein the extraction fluid is a caustic aqueous liquid, and
   ii) at least partially neutralising the extraction product or resin extract.

2. The process according to claim 1, wherein the isolated resin extract is anionic.

3. The process according to claim 1, comprising the further step of:
   iii) at least partly separating the resultant isolated resin extract from the extraction fluid to obtain a concentrated resin extract.

4. The extraction process according to claim 1, wherein the extraction fluid is provided in a ratio between 2:1 to 4:1 of extraction fluid to plant material on a weight basis.

5. The extraction process according to claim 1, wherein step i) involves applying an elevated temperature and/or pressure to the extraction fluid that is above 25° C. or atmospheric pressure.

6. The extraction process according to claim 5, wherein step i) involves an elevated temperature of at least 50° C.

7. The extraction process of claim 1, wherein the extraction product or isolated resin extract is subjected to treatment with an acid or catalyst to modify the thermosetting rate property thereof.

8. The extraction process of claim 7, wherein the treatment with the acid comprises adjusting the pH of the extraction product or isolated resin extract to be less than 5.

* * * * *